(12) United States Patent
Zhang et al.

(10) Patent No.: US 11,478,783 B2
(45) Date of Patent: Oct. 25, 2022

(54) WALL-FLOW HONEYCOMB CATALYST FOR DUST REMOVAL AND LOW-TEMPERATURE DENITRIFICATION OF FLUE GAS, AND PREPARATION PROCESS THEREOF

(71) Applicant: JIANGSU LONGKINGCOTECH CO., LTD., Yancheng (CN)

(72) Inventors: Tao Zhang, Yancheng (CN); Lifeng Deng, Longyan (CN); Anyang Liu, Yancheng (CN); Chunyun Luo, Yancheng (CN); Yingjie Ren, Yancheng (CN); Shengen Zhang, Yancheng (CN)

(73) Assignee: JIANGSU LONGKINGCOTECH CO., LTD., Yancheng (CN)

( * ) Notice: Subject to any disclaimer, the term of this patent is extended or adjusted under 35 U.S.C. 154(b) by 0 days.

(21) Appl. No.: 17/606,758

(22) PCT Filed: Apr. 6, 2021

(86) PCT No.: PCT/CN2021/085652
§ 371 (c)(1),
(2) Date: Oct. 26, 2021

(87) PCT Pub. No.: WO2021/248998
PCT Pub. Date: Dec. 16, 2021

(65) Prior Publication Data
US 2022/0212179 A1    Jul. 7, 2022

(30) Foreign Application Priority Data
Jun. 9, 2020  (CN) .................. 202010518416.8

(51) Int. Cl.
| | | |
|---|---|---|
| *B01J 35/04* | (2006.01) | |
| *B01D 53/86* | (2006.01) | |
| *B01J 35/02* | (2006.01) | |
| *B01J 35/10* | (2006.01) | |
| *B01J 37/08* | (2006.01) | |
| *B01J 23/28* | (2006.01) | |

(52) U.S. Cl.
CPC .......... *B01J 35/04* (2013.01); *B01D 53/8628* (2013.01); *B01J 23/28* (2013.01); *B01J 35/023* (2013.01); *B01J 35/1019* (2013.01); *B01J 37/08* (2013.01); *B01D 2255/20707* (2013.01); *B01D 2255/40* (2013.01); *B01D 2257/404* (2013.01); *B01D 2258/0283* (2013.01)

(58) Field of Classification Search
CPC . B01J 23/648; B01J 23/28; B01J 35/04; B01J 35/023; B01J 35/1019; B01J 37/08
See application file for complete search history.

(56) References Cited

U.S. PATENT DOCUMENTS

2016/0136616 A1*  5/2016  Yoshimura .......... B01J 37/0018
                                                    502/309

FOREIGN PATENT DOCUMENTS

| CN | 101678321 A | 3/2010 |
|---|---|---|
| CN | 102389805 A | 3/2012 |
| CN | 103586041 A | 2/2014 |
| CN | 106076315 A | 11/2016 |
| CN | 106238067 A | 12/2016 |
| CN | 106345454 A | 1/2017 |
| CN | 107876042 A | 4/2018 |
| CN | 109012712 A | 12/2018 |
| CN | 111036192 A | 4/2020 |

* cited by examiner

*Primary Examiner* — Yong L Chu
(74) *Attorney, Agent, or Firm* — Bayramoglu Law Offices LLC

(57) ABSTRACT

A wall-flow honeycomb catalyst for dust removal and low-temperature denitrification of flue gas, and a preparation process thereof are provided. The catalyst is prepared from the following raw materials in parts by weight: calcined titanium dioxide: 30 to 60 parts; crude titanium dioxide: 30 to 50 parts; boehmite: 3 to 5 parts; fused silica powder: 2 to 4 parts; binder: 0.5 to 2 parts; lubricant: 0.5 to 2 parts; vanadium-molybdenum composite oxide: 5 to 10 parts; and water: 150 to 200 parts; and the vanadium-molybdenum composite oxide is obtained by dissolving ammonium metavanadate and ammonium molybdate in an oxalic acid solution and spray-drying a resulting solution. The preparation process of the catalyst of the present disclosure is simple and low in cost.

6 Claims, 1 Drawing Sheet

WALL-FLOW HONEYCOMB CATALYST FOR DUST REMOVAL AND LOW-TEMPERATURE DENITRIFICATION OF FLUE GAS, AND PREPARATION PROCESS THEREOF

CROSS REFERENCE TO THE RELATED APPLICATIONS

This application is the national stage entry of International Application No. PCT/CN2021/085,652, filed on Apr. 6, 2021, which is based upon and claims priority to Chinese Patent Application No. 202010518416.8 filed on Jun. 9, 2020, the entire contents of which are incorporated herein by reference.

TECHNICAL FIELD

The present disclosure relates to the technical field of catalyst preparation, and in particular to a wall-flow honeycomb catalyst for dust removal and low-temperature denitrification of flue gas, and a preparation process thereof.

BACKGROUND

Nitrogen oxides (NOx) are one of the main air pollutants that cause acid rain, haze, and photochemical smog. In China, 24 million tons of NOx are emitted every year, and an annual loss of more than 300 billion yuan is caused by acid rain pollution. Dust is also one of the main air pollutants, especially fine particulate matters (PM) with a diameter of 10 microns or less, and a dust emission reaches 15 million tons annually. As the countries all over the world have more strict requirements on environmental protection, criterions related to sulfur dioxide, nitrogen oxide, and dust emission in the glass, coking, garbage incineration, and other industries are becoming more and more stringent. Due to low fume temperatures in the above industries, semi-dry/dry desulphurization is adopted at a front end to ensure that a $SO_2$ content is less than 50 $mg/Nm^3$, thereby ensuring a nitrogen oxide denitrification efficiency and a catalyst life at a low temperature (generally lower than 200° C.). However, there are still some problems in the current flue gas treatment process. For example, flue gas dust removal and denitrification are treated separately, such that respective technical systems and process flows are formed and special control devices are manufactured. The removal of dust and other harmful pollutants in flue gas needs at least two or more independent flue gas purification systems, which results in large floor space, high investment cost, large flue gas resistance, high operating cost, heavy burden on enterprises, poor efficiency, and other problems, especially for the denitrification of flue gas with a low dust content. Therefore, it is of great significance to develop a catalyst integrating dust removal and low-temperature denitrification.

However, it is known that many existing catalysts integrating dust removal and denitrification are prepared by coating a filter cartridge or a filter bag with a denitrification active substance. A filter prepared by the above method can achieve specified efficacy, but has the disadvantages of non-uniform catalyst dispersion in a ceramic filter, heavy abrasion, high load capacity, low dust removal and low-temperature denitrification efficiency, and the like.

SUMMARY

Based on the above-mentioned shortcomings in the prior art, the present disclosure is intended to provide a wall-flow honeycomb catalyst for dust removal and low-temperature denitrification of flue gas, and a preparation process thereof.

The wall-flow honeycomb catalyst for dust removal and low-temperature denitrification of flue gas according to the present disclosure is prepared as follows: mixing calcined titanium dioxide, crude titanium dioxide, boehmite, fused silica powder, dextrin, machine oil, and vanadium-molybdenum composite oxide to prepare a slurry; subjecting the slurry to extrusion-molding to obtain a honeycomb wet green body, and perforating and plugging the wet green body to form a wall-flow filter unit for dust removal; and subjecting the filter unit to high-temperature sintering to obtain the catalyst.

The preparation process of the catalyst of the present disclosure is simple and low in cost, and the prepared wall-flow honeycomb catalyst for dust removal and low-temperature denitrification of flue gas has high dust removal efficiency, high denitrification activity at 160° C. to 200° C., long life, and low cost, and serves as an integrated solution for dust removal and low-temperature denitrification after semi-dry/dry desulfurization in the glass, coking, garbage incineration, and other industries.

In a first aspect of the present disclosure, a wall-flow honeycomb catalyst for dust removal and low-temperature denitrification of flue gas is provided, which is prepared from the following raw materials in parts by weight:

Calcined titanium dioxide: 30 to 60 parts; crude titanium dioxide: 30 to 50 parts; boehmite: 3 to 5 parts; fused silica powder: 2 to 4 parts; binder: 0.5 to 2 parts; lubricant: 0.5 to 2 parts; vanadium-molybdenum composite oxide: 5 to 10 parts; and water: 150 to 200 parts.

The vanadium-molybdenum composite oxide is obtained by dissolving ammonium metavanadate and ammonium molybdate in an oxalic acid solution and spray-drying a resulting solution.

In the catalyst of the present disclosure, the vanadium-molybdenum composite oxide is an active substance; the two kinds of titanium dioxide with different specific surface areas (SSAs) (namely, calcined titanium dioxide and crude titanium dioxide) serve as a carrier; and the boehmite may have a particle size of d50≤3 μm to 4 μm and the fused silica powder may have a particle size of d50≤2 μm to 3 μm, which enhance the mechanical strength and abrasion resistance of the catalyst.

In some implementations of the present disclosure, the binder may be dextrin, which is cheaper than general adhesives and is prepared from readily-available raw materials.

In some implementations of the present disclosure, the lubricant may be machine oil, which is cheaper than commercial stearic acid, oleic acid, and the like.

In some implementations of the present disclosure, the calcined titanium dioxide may have an average particle size of 2.5 μm to 3.5 μm and an SSA of 250 $m^2/g$ to 350 $m^2/g$; and the crude titanium dioxide may have an average particle size of 4.5 μm to 5.5 μm and an SSA of 130 $m^2/g$ to 150 $m^2/g$.

The wall-flow honeycomb catalyst for dust removal and low-temperature denitrification prepared from the two kinds of titanium dioxide that have different particle sizes and SSAs and are in a mass ratio of 1:(1.1-2) may have a pore size controlled at 15 μm to 20 μm and can achieve a maximum dust removal efficiency of more than 95%.

In some implementations of the present disclosure, in the preparation of the vanadium-molybdenum composite oxide, a molar ratio of the ammonium metavanadate to the ammonium molybdate may be 1:(1-3).

Among the active components, the ammonium metavanadate plays the role of a main catalyst, and the ammonium molybdate plays the role of a catalyst accelerator. The combination of ammonium metavanadate and ammonium molybdate can ensure the maximum low-temperature denitrification efficiency based on the minimum amount of ammonium metavanadate.

In some implementations of the present disclosure, the dextrin may be obtained by mixing a flour with water to obtain a slurry and aging the slurry.

In a second aspect of the present disclosure, a preparation process of the wall-flow honeycomb catalyst for dust removal and low-temperature denitrification of flue gas according to the first aspect is provided, including the following steps:

S1: mixing and stirring the calcined titanium dioxide, the crude titanium dioxide, the boehmite, the fused silica powder, machine oil, the vanadium-molybdenum composite oxide, and the water to obtain a mixture;

S2: mixing a flour with water to form a slurry and aging the slurry to obtain the dextrin;

S3: mixing and stirring the mixture obtained in S1 and the dextrin obtained in S2 to obtain a slurry;

S4: compounding and sieving the slurry;

S5: subjecting the slurry treated in S4 to extrusion-molding with a honeycomb die to form a honeycomb ceramic green body; and drying, perforating, and plugging the honeycomb ceramic green body; and S6: conducting high-temperature sintering to obtain the catalyst.

In some implementations of the present disclosure, the aging may be conducted at 65° C. to 100° C.

In some implementations of the present disclosure, the honeycomb ceramic green body may have a cross-sectional area of (130-170 mm)×(130-170 mm).

In some implementations of the present disclosure, the high-temperature sintering may include: heating to 200° C. to 300° C. at a rate of <3° C./min and keeping at the temperature for 6 h to 12 h; heating to 450° C. to 500° C. and keeping at the temperature for 4 h to 12 h; and furnace-cooling to room temperature, and discharging.

Compared with the prior art, the present disclosure has the following beneficial effects:

(1) The present disclosure uses calcined titanium dioxide and crude titanium dioxide with two different particle sizes and different SSAs to prepare the wall-flow honeycomb catalyst for dust removal and low-temperature denitrification of flue gas, such that abundant pores with different sizes are distributed on a pore wall, which is beneficial to the full contact of the catalyst for dust removal and low-temperature denitrification of flue gas with flue gas, thereby achieving high dust removal rate and denitrification efficiency.

(2) The wall-flow honeycomb catalyst for dust removal and low-temperature denitrification prepared through extrusion-molding has wider active substance distribution and stronger abrasion resistance than existing coated catalysts.

(3) The catalyst of the present disclosure has low denitrification temperature and excellent cost performance, and involves a worldwide function mechanism. The preparation process of the catalyst involves abundant raw materials, low cost, easy molding, and reasonable sintering.

(4) The catalyst of the present disclosure is widely used for an integrated project of dust removal and low-temperature denitrification after semi-dry/dry desulfurization in the glass, coking, garbage incineration, and other industries.

DETAILED DESCRIPTION OF THE EMBODIMENTS

The implementations of the present disclosure are described below through specific examples, and those skilled in the art can easily understand other advantages and effects of the present disclosure from the contents disclosed in this specification. The present disclosure can also be implemented or applied through other different specific implementations. Based on different viewpoints and applications, various modifications or amendments can be made to various details of this specification without departing from the spirit of the present disclosure.

Unless otherwise specified, the following examples and comparative examples are parallel experiments, which adopt the same treatment steps and parameters. Technical route: raw materials are mixed to prepare a slurry; the slurry is subjected to extrusion-molding to form a honeycomb wet green body, and the wet green body is perforated and plugged to form a wall-flow filter unit for dust removal; and the filter unit is subjected to high-temperature sintering to obtain a catalyst with a pore size of 15 μm to 20 μm, where the calcined titanium dioxide has an average particle size of 3 μm; the crude titanium dioxide has an average particle size of 5 μm; the boehmite has a particle size of d50≤3 μm to 4 μm; and the fused silica powder has a particle size of d50≤2 μm to 3 μm. The dextrin is prepared by adding 30 g of a flour per 100 ml of water, and the water for preparing the dextrin is not counted in the water for preparing the slurry.

Figure 1:
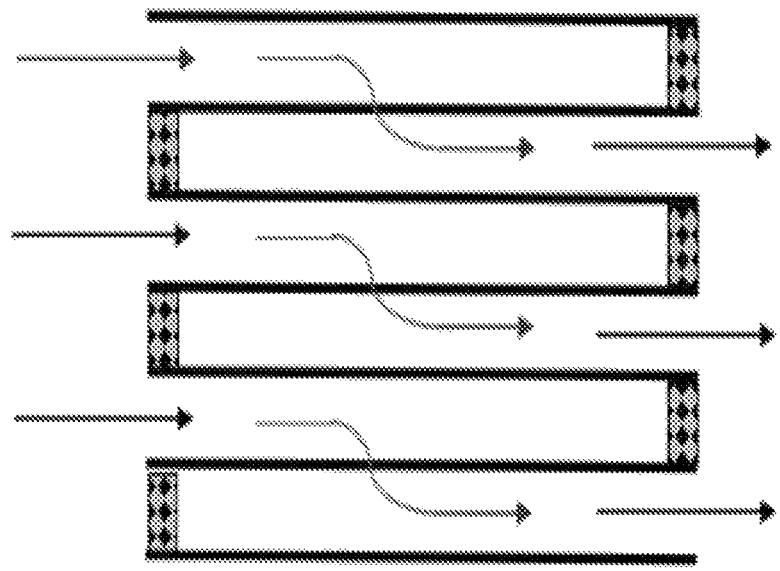
FIG. 1 is a schematic diagram of flue gas flow direction when the wall-flow honeycomb catalyst for dust removal and low-temperature denitrification of flue gas according to the present disclosure is in use.
Figure 2:
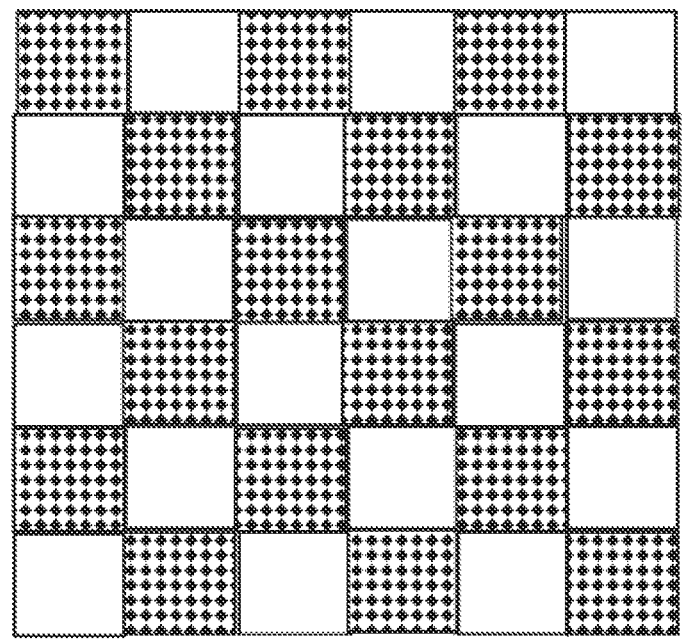
FIG. 2 is a schematic structural diagram of an implementation of the wall-flow honeycomb catalyst for dust removal and low-temperature denitrification of flue gas according to the present disclosure.

The wall-flow honeycomb catalyst for dust removal and low-temperature denitrification according to the present disclosure has an external structure shown in FIG. 2, and during use, flue gas to be treated is subjected to dust removal and low-temperature denitrification in a direction shown in FIG. 1. Flue gas with dust and nitrogen oxides is thoroughly mixed with a $NH_3$ gas, then enters from one end of the honeycomb catalyst, and passes through a side wall of a pore adjacent to an unclosed pore on the inlet end, such that smoke dust in the flue gas is removed through filtration of the side wall; and a residence time of the flue gas is extended, such that $NH_3$ reduces nitrogen oxides into nitrogen and water at a low temperature under the action of the active substance catalyst on a wall surface. Dust can be removed by regular pulse air blowback, collecting and recovering dust, which can ensure continuous dust removal and low-temperature denitrification.

Example 1

A preparation process of a wall-flow honeycomb catalyst for dust removal and low-temperature denitrification of flue gas was provided, including the following steps:

(1) The following components in parts by weight were weighed: calcined titanium dioxide: 50 parts; crude titanium dioxide: 30 parts; boehmite: 5 parts; fused silica powder: 4 parts; binder: 1.5 parts; machine oil: 1.5 parts; vanadium-molybdenum composite oxide: 8 parts; and water: 200 parts.

The calcined titanium dioxide had an SSA of 250 $m^2/g$ and the crude titanium dioxide had an SSA of 150 $m^2/g$. The vanadium-molybdenum composite oxide was obtained by dissolving 0.1 mol of ammonium metavanadate and 0.1 mol of ammonium molybdate per 1 L of an oxalic acid solution and spray-drying a resulting solution.

(2) The calcined titanium dioxide and the crude titanium dioxide were added to a mixer, then the boehmite, the fused silica powder, the machine oil, the vanadium-molybdenum composite oxide, and the water were added, and a resulting mixture was fully stirred for later use.

(3) The flour and water were mixed at room temperature to prepare a slurry, and the slurry was aged at 65° C. to obtain dextrin.

(4) The dextrin was mixed with the mixture obtained in step (2) in a mixer, and a resulting slurry was stirred for 3 h.

(5) The slurry was compounded and sieved for thorough homogenization.

(6) The slurry was subjected to extrusion-molding with a honeycomb die to form a honeycomb ceramic green body with a cross section of 150 mm×150 mm; and then the honeycomb ceramic green body was dried at room temperature, perforated, and plugged.

(7) The honeycomb ceramic green body was heated to 200° C. at a rate of <3° C./min and kept at the temperature for 12 h, then heated to 450° C. and kept at the temperature for 12 h, furnace-cooled to room temperature, and discharged to obtain the desired catalyst.

Example 2

A preparation process of a wall-flow honeycomb catalyst for dust removal and low-temperature denitrification of flue gas was provided, including the following steps:

(1) The following components in parts by weight were weighed: calcined titanium dioxide: 40 parts; crude titanium dioxide: 49 parts; boehmite: 3 parts; fused silica powder: 2 parts; binder: 1.5 parts; machine oil: 1.5 parts; vanadium-molybdenum composite oxide: 5 parts; and water: 150 parts.

The calcined titanium dioxide had an SSA of 350 m$^2$/g and the crude titanium dioxide had an SSA of 150 m$^2$/g. The vanadium-molybdenum composite oxide was obtained by dissolving 0.15 mol of ammonium metavanadate and 0.45 mol of ammonium molybdate per 1 L of an oxalic acid solution and spray-drying a resulting solution.

(2) The calcined titanium dioxide and the crude titanium dioxide were added to a mixer, then the boehmite, the fused silica powder, the machine oil, the vanadium-molybdenum composite oxide, and the water were added, and a resulting mixture was fully stirred for later use.

(3) The flour and water were mixed at room temperature to prepare a slurry, and the slurry was aged at 100° C. to obtain dextrin.

(4) The dextrin was mixed with the mixture obtained in step (2) in a mixer, and a resulting slurry was stirred for 1 h.

(5) The slurry was compounded and sieved for thorough homogenization.

(6) The slurry was subjected to extrusion-molding with a honeycomb die to form a honeycomb ceramic green body with a cross section of 150 mm×150 mm; and then the honeycomb ceramic green body was dried at room temperature, perforated, and plugged.

(7) The honeycomb ceramic green body was heated to 300° C. at a rate of <3° C./min and kept at the temperature for 6 h, then heated to 500° C. and kept at the temperature for 4 h, furnace-cooled to room temperature, and discharged to obtain the desired catalyst.

Example 3

A preparation process of a wall-flow honeycomb catalyst for dust removal and low-temperature denitrification of flue gas was provided, including the following steps:

(1) The following components in parts by weight were weighed: calcined titanium dioxide: 45 parts; crude titanium dioxide: 40 parts; boehmite: 4 parts; fused silica powder: 4 parts; binder: 1.5 parts; machine oil: 1.5 parts; vanadium-molybdenum composite oxide: 7 parts; and water: 180 parts.

The calcined titanium dioxide had an SSA of 300 m$^2$/g and the crude titanium dioxide had an SSA of 140 m$^2$/g. The vanadium-molybdenum composite oxide was obtained by dissolving 0.1 mol of ammonium metavanadate and 0.2 mol of ammonium molybdate per 1 L of an oxalic acid solution and spray-drying a resulting solution.

(2) The calcined titanium dioxide and the crude titanium dioxide were added to a mixer, then the boehmite, the fused silica powder, the machine oil, the vanadium-molybdenum composite oxide, and the water were added, and a resulting mixture was fully stirred for later use.

(3) The flour and water were mixed at room temperature to prepare a slurry, and the slurry was aged at 90° C. to obtain dextrin.

(4) The dextrin was mixed with the mixture obtained in step (2) in a mixer, and a resulting slurry was stirred for 2 h.

(5) The slurry was compounded and sieved for thorough homogenization.

(6) The slurry was subjected to extrusion-molding with a honeycomb die to form a honeycomb ceramic green body with a cross section of 150 mm×150 mm; and then the honeycomb ceramic green body was dried at room temperature, perforated, and plugged.

(7) The honeycomb ceramic green body was heated to 300° C. at a rate of <3° C./min and kept at the temperature for 8 h, then heated to 480° C. and kept at the temperature for 8 h, furnace-cooled to room temperature, and discharged to obtain the desired catalyst.

Example 4

A preparation process of a wall-flow honeycomb catalyst for dust removal and low-temperature denitrification of flue gas was provided, including the following steps:

(1) The following components in parts by weight were weighed: calcined titanium dioxide: 48 parts; crude titanium dioxide: 42 parts; boehmite: 3 parts; fused silica powder: 2 parts; binder: 1.5 parts; machine oil: 1.5 parts; vanadium-molybdenum composite oxide: 5 parts; and water: 170 parts.

The calcined titanium dioxide had an SSA of 328 m$^2$/g and the crude titanium dioxide had an SSA of 130 m$^2$/g. The vanadium-molybdenum composite oxide was obtained by dissolving 0.15 mol of ammonium metavanadate and 0.15 mol of ammonium molybdate per 1 L of an oxalic acid solution and spray-drying a resulting solution.

(2) The calcined titanium dioxide and the crude titanium dioxide were added to a mixer, then the boehmite, the fused silica powder, the machine oil, the vanadium-molybdenum composite oxide, and the water were added, and a resulting mixture was fully stirred for later use.

(3) The flour and water were mixed at room temperature to prepare a slurry, and the slurry was aged at 100° C. to obtain dextrin.

(4) The dextrin was mixed with the mixture obtained in step (2) in a mixer, and a resulting slurry was stirred for 3 h.

(5) The slurry was compounded and sieved for thorough homogenization.

(6) The slurry was subjected to extrusion-molding with a honeycomb die to form a honeycomb ceramic green body with a cross section of 150 mm×150 mm; and then the honeycomb ceramic green body was dried at room temperature, perforated, and plugged.

(7) The honeycomb ceramic green body was heated to 200° C. at a rate of <3° C./min and kept at the temperature for 12 h, then heated to 500° C. and kept at the temperature for 8 h, furnace-cooled to room temperature, and discharged to obtain the desired catalyst.

Example 5

A preparation process of a wall-flow honeycomb catalyst for dust removal and low-temperature denitrification of flue gas was provided, including the following steps:

(1) The following components in parts by weight were weighed: calcined titanium dioxide: 44 parts; crude titanium dioxide: 40 parts; boehmite: 3 parts; fused silica powder: 2 parts; binder: 0.5 parts; machine oil: 0.5 parts; vanadium-molybdenum composite oxide: 8 parts; and water: 190 parts.

The calcined titanium dioxide had an SSA of 320 $m^2/g$ and the crude titanium dioxide had an SSA of 130 $m^2/g$. The vanadium-molybdenum composite oxide was obtained by dissolving 0.1 mol of ammonium metavanadate and 0.3 mol of ammonium molybdate per 1 L of an oxalic acid solution and spray-drying a resulting solution.

(2) The calcined titanium dioxide and the crude titanium dioxide were added to a mixer, then the boehmite, the fused silica powder, the machine oil, the vanadium-molybdenum composite oxide, and the water were added, and a resulting mixture was fully stirred for later use.

(3) The flour and water were mixed at room temperature to prepare a slurry, and the slurry was aged at 90° C. to obtain dextrin.

(4) The dextrin was mixed with the mixture obtained in step (2) in a mixer, and a resulting slurry was stirred for 2 h.

(5) The slurry was compounded and sieved for thorough homogenization.

(6) The slurry was subjected to extrusion-molding with a honeycomb die to form a honeycomb ceramic green body with a cross section of 150 mm×150 mm; and then the honeycomb ceramic green body was dried at room temperature, perforated, and plugged.

(7) The honeycomb ceramic green body was heated to 250° C. at a rate of <3° C./min and kept at the temperature for 10 h, then heated to 500° C. and kept at the temperature for 12 h, furnace-cooled to room temperature, and discharged to obtain the desired catalyst.

Comparative Example 1

A preparation process of a wall-flow honeycomb catalyst for dust removal and low-temperature denitrification of flue gas was provided, including the following steps:

(1) The following components in parts by weight were weighed: calcined titanium dioxide: 80 parts; boehmite: 5 parts; fused silica powder: 4 parts; binder: 1.5 parts; machine oil: 1.5 parts; vanadium-molybdenum composite oxide: 8 parts; and water: 200 parts.

The calcined titanium dioxide had an SSA of 250 $m^2/g$. The vanadium-molybdenum composite oxide was obtained by dissolving 0.1 mol of ammonium metavanadate and 0.1 mol of ammonium molybdate per 1 L of an oxalic acid solution and spray-drying a resulting solution.

(2) The calcined titanium dioxide was added to a mixer, then the boehmite, the fused silica powder, the machine oil, the vanadium-molybdenum composite oxide, and the water were added, and a resulting mixture was fully stirred for later use.

(3) The flour and water were mixed at room temperature to prepare a slurry, and the slurry was aged at 65° C. to obtain dextrin.

(4) The dextrin was mixed with the mixture obtained in step (2) in a mixer, and a resulting slurry was stirred for 3 h.

(5) The slurry was compounded and sieved for thorough homogenization.

(6) The slurry was subjected to extrusion-molding with a honeycomb die to form a honeycomb ceramic green body with a cross section of 150 mm×150 mm; and then the honeycomb ceramic green body was dried at room temperature, perforated, and plugged.

(7) The honeycomb ceramic green body was heated to 200° C. at a rate of <3° C./min and kept at the temperature for 12 h, then heated to 450° C. and kept at the temperature for 12 h, furnace-cooled to room temperature, and discharged to obtain the desired catalyst.

Comparative Example 2

A preparation process of a wall-flow honeycomb catalyst for dust removal and low-temperature denitrification of flue gas was provided, including the following steps:

(1) The following components in parts by weight were weighed: calcined titanium dioxide: 50 parts; crude titanium dioxide: 30 parts; boehmite: 5 parts; fused silica powder: 4 parts; binder: 1.5 parts; machine oil: 1.5 parts; ammonium metavanadate: 4 parts; ammonium molybdate: 4 parts; and water: 200 parts.

The calcined titanium dioxide had an SSA of 250 $m^2/g$ and the crude titanium dioxide had an SSA of 150 $m^2/g$.

(2) The calcined titanium dioxide and the crude titanium dioxide were added to a mixer, then the boehmite, the fused silica powder, the machine oil, the ammonium metavanadate, the ammonium molybdate, and the water were added, and a resulting mixture was fully stirred for later use.

(3) The flour and water were mixed at room temperature to prepare a slurry, and the slurry was aged at 65° C. to obtain dextrin.

(4) The dextrin was mixed with the mixture obtained in step (2) in a mixer, and a resulting slurry was stirred for 3 h.

(5) The slurry was compounded and sieved for thorough homogenization.

(6) The slurry was subjected to extrusion-molding with a honeycomb die to form a honeycomb ceramic green body with a cross section of 150 mm×150 mm; and then the honeycomb ceramic green body was dried at room temperature, perforated, and plugged.

(7) The honeycomb ceramic green body was heated to 200° C. at a rate of <3° C./min and kept at the temperature for 12 h, then heated to 450° C. and kept at the temperature for 12 h, furnace-cooled to room temperature, and discharged to obtain the desired catalyst.

Comparative Example 3

A preparation process of a wall-flow honeycomb catalyst for dust removal and low-temperature denitrification of flue gas was provided, including the following steps:

(1) The following components in parts by weight were weighed: titanium dioxide for commercial production: 80 parts; boehmite: 5 parts; fused silica powder: 4 parts; binder: 1.5 parts; machine oil: 1.5 parts; vanadium-molybdenum composite oxide: 8 parts; and water: 200 parts.

The titanium dioxide for commercial production had an SSA of 100 m$^2$/g. The vanadium-molybdenum composite oxide was obtained by dissolving 0.1 mol of ammonium metavanadate and 0.1 mol of ammonium molybdate per 1 L of an oxalic acid solution and spray-drying a resulting solution.

(2) The titanium dioxide for commercial production was added to a mixer, then the boehmite, the fused silica powder, the machine oil, the vanadium-molybdenum composite oxide, and the water were added, and a resulting mixture was fully stirred for later use.

(3) The flour and water were mixed at room temperature to prepare a slurry, and the slurry was aged at 65° C. to obtain dextrin.

(4) The dextrin was mixed with the mixture obtained in step (2) in a mixer, and a resulting slurry was stirred for 3 h.

(5) The slurry was compounded and sieved for thorough homogenization.

(6) The slurry was subjected to extrusion-molding with a honeycomb die to form a honeycomb ceramic green body with a cross section of 150 mm×150 mm; and then the honeycomb ceramic green body was dried at room temperature, perforated, and plugged.

(7) The honeycomb ceramic green body was heated to 200° C. at a rate of <3° C./min and kept at the temperature for 12 h, then heated to 450° C. and kept at the temperature for 12 h, furnace-cooled to room temperature, and discharged to obtain the desired catalyst.

Performance test of wall-flow honeycomb catalyst for dust removal and low-temperature denitrification:

The catalysts prepared in Examples 1 to 5 and Comparative Examples 1 to 3 were subjected to a dust removal efficiency test on a dust removal device in a fixed bed reactor, where fly ash was used as a dust medium.

Low-temperature test conditions: NO: 500 mg/Nm$^3$, NH$_3$: 500 Nm$^3$, O$_2$: 5%, SO$_2$: 100 mg/Nm$^3$, H$_2$O: 5%, equilibrium gas: N$_2$, AV: 6.5 m/h, and catalyst: 25×25 pore, and length: 500 mm.

NOx concentrations at an inlet and an outlet were detected using an MRU flue gas analyzer at 160° C., 180° C., and 200° C.

TABLE 1

Test results of dust removal and denitrification performance of different catalysts

| Catalyst | Dust removal rate | Catalyst denitrification activity (%) | | |
|---|---|---|---|---|
| | | 160° C. | 180° C. | 200° C. |
| Example 1 | 95.5 | 85.9 | 88.5 | 90.7 |
| Example 2 | 95.8 | 83.8 | 86.7 | 91.4 |
| Example 3 | 95.7 | 84.6 | 89.8 | 92.8 |
| Example 4 | 96.2 | 86.4 | 87.6 | 91.9 |
| Example 5 | 95.7 | 83.6 | 88.1 | 90.8 |
| Comparative Example 1 | 85.2 | 68.1 | 75.5 | 81.9 |
| Comparative Example 2 | 88.7 | 65.3 | 73.2 | 80.2 |
| Comparative Example 3 | 80.3 | 74.6 | 78.6 | 79.8 |

It can be seen from Table 1 that, compared with Comparative Examples 1 and 3, the wall-flow honeycomb catalyst for dust removal and low-temperature denitrification of flue gas prepared in each of Examples 1 and 5 has high dust removal rate and high low-temperature denitrification efficiency, indicating that the use of the combination of titanium dioxide with an SSA of 250 m$^2$/g to 350 m$^2$/g and titanium dioxide with an SSA of 130 m$^2$/g to 150 m$^2$/g as a carrier in the present disclosure is superior to the use of titanium dioxide with an SSA of 250 m$^2$/g or titanium dioxide with an SSA of 100 m$^2$/g alone as a carrier.

Compared with Comparative Example 2, the wall-flow honeycomb catalyst for dust removal and low-temperature denitrification of flue gas prepared in each of Examples 1 and 5 has high dust removal rate and high low-temperature denitrification efficiency, indicating that the use of the vanadium-molybdenum composite oxide (which is obtained by dissolving ammonium metavanadate and ammonium molybdate in an oxalic acid solution and spray-drying a resulting solution) as an active substance in the present disclosure is superior to the direct addition of ammonium metavanadate and ammonium molybdate to titanium dioxide.

Unless otherwise specified, the raw materials and devices used in the present disclosure are all common raw materials and devices in the art; and unless otherwise specified, the methods used in the present disclosure are all conventional methods in the art.

The preferred specific implementations and examples of the present disclosure are described in detail above, but the present disclosure is not limited to the above implementations and examples. Within the knowledge of those skilled in the art, various variations can also be made without departing from the concept of the present disclosure.

What is claimed is:

1. A wall-flow honeycomb catalyst for dust removal and low-temperature denitrification of flue gas, formed by subjecting a slurry to molding and high-temperature sintering; wherein the slurry comprises the following raw materials in parts by weight:

calcined titanium dioxide: 30 to 60 parts; crude titanium dioxide: 30 to 50 parts; boehmite: 3 to 5 parts; fused silica powder: 2 to 4 parts; binder: 0.5 to 2 parts; lubricant: 5 to 2 parts; vanadium-molybdenum composite oxide: 5 to 10 parts; and water: 150 to 200 parts; and the vanadium-molybdenum composite oxide is obtained by dissolving ammonium metavanadate and ammonium molybdate in an oxalic acid solution and spray-drying a resulting solution;

the calcined titanium dioxide has an average particle size of 2.5 μm to 3.5 μm and a specific surface area (SSA) of 250 m$^2$/g to 350 m$^2$/g; and the crude titanium dioxide has an average particle size of 4.5 μm to 5.5 μm and an SSA of 130 m$^2$/g to 150 m$^2$/g;

the binder is dextrin;
a preparation process of the catalyst comprises the following steps:
S1: mixing and stirring the calcined titanium dioxide, the crude titanium dioxide, the boehmite, the fused silica powder, the lubricant, the vanadium-molybdenum composite oxide, and the water to obtain a mixture;
S2: mixing a flour with water to form a mixed slurry and aging the mixed slurry to obtain the dextrin;
S3: mixing and stirring the mixture obtained in S1 and the dextrin obtained in S2 to obtain a slurry;
S4: compounding and sieving the slurry;
S5: subjecting the slurry treated in S4 to extrusion-molding with a honeycomb die to form a honeycomb ceramic green body; and drying, perforating, and plugging the honeycomb ceramic green body; and
S6: conducting high-temperature sintering to obtain the catalyst.

2. The wall-flow honeycomb catalyst according to claim 1, wherein the lubricant is machine oil.

3. The wall-flow honeycomb catalyst according to claim 1, wherein in the preparation of the vanadium-molybdenum composite oxide, a molar ratio of the ammonium metavanadate to the ammonium molybdate is 1:(1-3).

4. The wall-flow honeycomb catalyst according to claim 1, wherein the aging is conducted at 65° C. to 100° C.

5. The wall-flow honeycomb catalyst according to claim 1, wherein the honeycomb ceramic green body has a cross-sectional area of (130-170 mm) x (130-170 mm).

6. The wall-flow honeycomb catalyst according to claim 1, wherein the high-temperature sintering comprises: heating to 200° C. to 300° C. at a rate of <3° C./min and keeping at the temperature for 6 h to 12 h; heating to 450° C. to 500° C. and keeping at the temperature for 4 h to 12 h; and furnace-cooling to room temperature, and discharging.

* * * * *